(12) United States Patent
Finnin, Jr.

(10) Patent No.: US 9,723,941 B2
(45) Date of Patent: Aug. 8, 2017

(54) STAND FOR ELONGATED OBJECTS

(71) Applicant: John A. Finnin, Jr., Fort Myers, FL (US)

(72) Inventor: John A. Finnin, Jr., Fort Myers, FL (US)

(*) Notice: Subject to any disclaimer, the term of this patent is extended or adjusted under 35 U.S.C. 154(b) by 0 days.

(21) Appl. No.: 15/422,445

(22) Filed: Feb. 1, 2017

(65) Prior Publication Data
US 2017/0143149 A1 May 25, 2017

Related U.S. Application Data

(63) Continuation-in-part of application No. 14/816,496, filed on Aug. 3, 2015, now Pat. No. 9,615,686.
(60) Provisional application No. 62/032,627, filed on Aug. 3, 2014.

(51) Int. Cl.
| | |
|---|---|
| *A47G 33/12* | (2006.01) |
| *F16M 11/04* | (2006.01) |
| *F16B 2/10* | (2006.01) |
| *E04H 12/22* | (2006.01) |

(52) U.S. Cl.
CPC ......... *A47G 33/1206* (2013.01); *A47G 33/12* (2013.01); *A47G 33/1213* (2013.01); *E04H 12/22* (2013.01); *E04H 12/2238* (2013.01); *E04H 12/2269* (2013.01); *E04H 12/2276* (2013.01); *E04H 12/2284* (2013.01); *F16B 2/10* (2013.01); *F16M 11/04* (2013.01); *A47G 2033/124* (2013.01)

(58) Field of Classification Search
CPC ............ A47G 33/12; A47G 33/1213; A47G 33/1206; A47G 2033/124; E04H 12/2238; E04H 12/2269; E04H 12/22; E04H 12/2284; E04H 12/2276; F16M 11/04; F16B 2/10

USPC ............ 47/42, 40.5; 248/523, 524, 525, 526
See application file for complete search history.

(56) References Cited

U.S. PATENT DOCUMENTS

| | | | |
|---|---|---|---|
| 2,410,227 A | 10/1946 | Matthews | |
| 2,891,747 A | 6/1959 | Steede | |
| 3,136,514 A | 6/1964 | Rzepela | |

(Continued)

FOREIGN PATENT DOCUMENTS

| | | | | |
|---|---|---|---|---|
| DE | 29706970 U1 | * | 6/1997 | ............. A47G 33/12 |
| DE | 10025864 A1 | * | 2/2001 | ......... A47G 33/1206 |

(Continued)

OTHER PUBLICATIONS

Black & Decker Smart Stand, Amazon, https://www.amazon.com/Black-Decker-Smart-Stand-17/dp/B018JSP6WG/ref=sr_1_2?s=home-garden&ie=UTF8&qid=1451926143&sr=1-2&keywords=krinner+ch.

*Primary Examiner* — Eret McNichols
(74) *Attorney, Agent, or Firm* — William F. Lang, IV; Lang Patent Law LLC

(57) ABSTRACT

A stand for Christmas trees and other elongated objects includes spring biased, movable arm assemblies, with each arm assembly including a base arm and a gripping arm pivotally secured to the base arm. The gripping arm includes upper and lower elongated object engaging surfaces. When a Christmas tree or other elongated objects is pressed to downward between the arm assemblies, the elongated object contacts the lower object engaging surfaces, bringing the upper object engaging surfaces into contact with the elongated object. Spring pressure supplied by springs within the arm assemblies retains the elongated object within the stand.

8 Claims, 20 Drawing Sheets

(56) References Cited

U.S. PATENT DOCUMENTS

| | | |
|---|---|---|
| 3,301,512 A | 1/1967 | Nyberg |
| 3,754,403 A | 8/1973 | Mott et al. |
| 4,130,965 A | 12/1978 | Patton et al. |
| 5,114,113 A | 5/1992 | Krinner |
| D330,346 S | 10/1992 | Bryand |
| 5,160,110 A | 11/1992 | Praegitzer |
| 5,464,186 A | 11/1995 | Robert |
| 5,465,529 A | 11/1995 | Park |
| 5,535,977 A | 7/1996 | Poeshty |
| 5,918,849 A | 7/1999 | Bliss |
| 6,019,341 A | 2/2000 | Brown et al. |
| 6,023,882 A | 2/2000 | Heinrich |
| 6,572,069 B1 | 6/2003 | Kotthaus |
| 6,854,700 B2 | 2/2005 | Schmitz |
| 6,988,702 B2 | 1/2006 | Schulz |
| 7,341,234 B2 | 3/2008 | Kowalski |
| 7,484,703 B2 | 2/2009 | Krinner |
| 7,484,704 B2 | 2/2009 | Schommertz |
| 7,494,026 B2 | 2/2009 | Bard et al. |
| D590,295 S | 4/2009 | Clores et al. |
| 7,618,022 B2 | 11/2009 | Thurner |
| 7,752,806 B2 | 7/2010 | Krinner |
| 8,037,637 B2 | 10/2011 | Odom, Jr. |
| 8,205,851 B2 | 6/2012 | Herbert |
| 8,978,295 B2 | 3/2015 | Bard et al. |
| 2002/0005466 A1* | 1/2002 | Thurner ............ A47G 33/1213 248/523 |
| 2005/0051695 A1 | 3/2005 | Kovach |
| 2011/0284717 A1* | 11/2011 | Schulz ............... A47G 33/1213 248/515 |
| 2012/0102830 A1 | 5/2012 | Bard et al. |
| 2015/0308140 A1 | 10/2015 | Clifton |

FOREIGN PATENT DOCUMENTS

| | | | |
|---|---|---|---|
| DE | 19953436 A1 * | 5/2001 | ......... A47G 33/1206 |
| DE | 10011712 A1 | 6/2001 | |
| DE | 10000879 A1 * | 7/2001 | ......... A47G 33/1213 |
| DE | WO 0224041 A1 * | 3/2002 | ......... A47G 33/1213 |
| DE | 19931309 C2 | 6/2003 | |
| DE | 20 2005 006 285 | 6/2005 | |
| DE | 10361485 A1 * | 7/2005 | ......... A47G 33/1213 |
| DE | WO 2005087062 A2 * | 9/2005 | ......... A47G 33/1213 |
| DE | 102005003266 B3 | 2/2006 | |
| DE | 202011107724 U1 | 3/2012 | |
| EP | 2810590 A1 | 12/2014 | |

* cited by examiner

STAND FOR ELONGATED OBJECTS

CROSS REFERENCE TO RELATED APPLICATION

This application is a continuation in part of U.S. utility patent application Ser. No. 14/816,496, filed on Aug. 3, 2015, and entitled "Stand for Elongated Objects," which claims the benefit of U.S. provisional patent application Ser. No. 62/032,627, filed on Aug. 3, 2014, and entitled "Christmas Tree Stand."

TECHNICAL FIELD

The present invention relates to stands for elongated objects. More specifically, a stand providing simplified installation and removal of elongated objects is provided.

BACKGROUND INFORMATION

Elongated objects such as Christmas trees, flag poles, etc. are often used for holiday and other displays. Many presently available Christmas tree stands utilize a base having four individual threaded rods to engage the tree trunk. Installation of a tree into such a stand typically requires two people: one person to hold the tree, and another to individually tighten the threaded rods against the trunk until the tree is held upright. Given the difficulty and inconvenience of using such a stand, various alternatives have been proposed.

An example of such an alternative is U.S. Pat. No. 6,988,702, which discloses a holding device that is particularly useful for Christmas trees. The holding device includes four rails upon which sliding elements are mounted. The sliding elements include holding elements for engaging a tree trunk. A wire rope extends around the Christmas tree stand, engaging each of the sliding elements in a manner so that, when the wire rope is tightened, the sliding or carriage elements are pulled inward towards the center of the stand. The wire rope is structured to be wound around a roller that is connected to a gear wheel having a plurality of teeth. A spring biased catch is structured to permit rotation of the gear wheel in one direction, and to resist rotation in the other direction until it is pulled away from the gear wheel. A foot pedal is provided, and is structured so that pushing the foot pedal downward towards the base turns the roller in a direction the tightens the wire rope, with the catch and gear wheel holding the roller in place after each press of the foot pedal. Pushing the foot pedal in the opposite direction releases the catch, permitting the sliding elements to move away from the tree trunk. Springs are provided on the sliding elements for this purpose. In an alternative embodiment, the sliding carriages are replaced by pivoting levers.

U.S. Pat. No. 3,301,512 discloses a tree holder. The tree holder includes a horizontal table having downwardly extending feet and a hole defined within its center. A pair of levers are pivotally mounted on either side of the hole. The levers include a lower end that is structured to engage the bottom of a tree trunk, and an upper end that is designed to pivot towards and grip the tree trunk upon the weight of the tree trunk pushing downward on the bottom of the levers. An external, manually operated lever is used to further push the tree retaining levers into the tree to fully secure the tree. Movement of the manually operated lever in the opposite direction releases the tree.

U.S. Pat. No. 5,114,113 discloses a Christmas tree stand. The Christmas tree stand includes a cylindrical base having four clamping arms pivotally attached around its circumference. A cable surrounds and engages all four clamping arms, so that pulling the cable draws the clamping arms inward. Each of the clamping arms is spring biased outward. The cable is tightened by a clamping device having a roller upon which the cable is wound, and a toothed wheel attached to the roller. A foot pedal is used to rotate the roller and toothed wheel. A release bar that is biased towards the toothed wheel by a tension spring is attached to the foot pedal, engaging the toothed wheel unless it is manually pushed away from the toothed wheel. Operation of the foot pedal turns the roller, incrementally tightening the cable, pulling the arms inward. When one of the arms contacts the tree trunk, it will stop, but the other arms will continue to be pulled inward until they contact the tree trunk as well. The tree is then held in place until the release bar is pushed out of engagement with the toothed wheel, permitting the clamping arms to move away from the tree trunk under spring bias.

US 2012/0102830 discloses a self-adjusting, self-actuating, and clamping stand for holding vertical objects. The stand includes a base with a platform disposed above the base. The platform supports a container for holding the bottom end of the tree trunk. Three jaws are pivotally secured around the container. The jaws are weighted in a manner that counterbalances them towards their open position. A cable extends around the jaws, as well as engaging the platform. When a tree trunk is placed into the container, it pushes downward on the platform, so that the weight of the tree trunk causes the platform to pull the cable, thereby pulling the jaws inward in order to engage the tree trunk. The entire apparatus can be rotated on a turntable to facilitate decorating the tree.

U.S. Pat. No. 7,484,704 discloses a stand for pole shaped objects such as Christmas trees. The stand includes a housing having four retaining levers pivotally secured to its top edge. A cable extends around the stands passing through a hole in each of the retaining levers. A clamping device in the form of a foot pedal is used to operate a ratcheting mechanism to wind the cable so that the clamping levers are pulled inward against a tree trunk in order to retain a Christmas tree. A release lever is provided on the clamping device to release the retaining levers. The retaining levers are spring biased towards an outward position, so that upon release of the ratcheting mechanism, they move outward under spring pressure to release the Christmas tree.

U.S. Pat. No. 7,484,703 discloses a Christmas tree stand. The tree stand includes a flat foot piece with an upwardly extending, generally cylindrical receiving part. A plurality of retaining elements are pivotally secured around the top of the receiving part. A cable extends around the tree stand, passing through holes within the retaining elements, so that tightening the cable pulls the retaining elements inward towards the center of the stand. Each of the retaining elements is spring biased towards the exterior of the stand. A tensioning device is provided for tightening the cable. The cable is attached to the tensioning device through a spring. When the retaining elements are brought up against the tree trunk, the spring permits the retaining elements to be held against the trunk with enough force to hold the tree in position, but not so much force as to prevent adjustments of the position of the tree. Further tightening of the tensioning device then applies full clamping force to the base of the tree.

U.S. Pat. No. 7,341,234 discloses a Christmas tree stand. The Christmas tree stand includes a flat foot part and an upwardly extending, generally cylindrical receiving part. Four retaining elements are hingedly secured around the top of the receiving part. A cable extends around the tree stand, passing through holes in each of the retaining elements, so that tightening the cable pulls the retaining elements towards the central axis of the tree stand. The ends of the cable are secured to the cable drum of a tensioning device. The tensioning device includes a tension lever for rotating the cable drum, and a ratchet wheel connected to the cable drum. A lever catch on the tension lever is biased by a spring towards the teeth of the ratchet wheel. The lever catch engages the ratchet wheel when the tension lever is moved downward, and ratchets to release the ratchet wheel when the tension lever is moved upward. A first catch holds the ratchet wheel in place until released by moving the tension lever towards its uppermost position. Upon the release of the first catch, a second catch engages the ratchet wheel. Upon moving the tension lever to release the second catch, the first catch re-engages the ratchet wheel. The operation of these two catches permits tension to be incrementally released from the tensioning device.

U.S. Pat. No. 6,854,700 discloses a foot support for essentially cylindrical elements. The stand includes a base having a receptacle secured thereto. The receptacle includes three levers pivotally secured thereto. Each lever includes an upper arm for engaging a tree trunk, and a lower arm for engaging an actuating ring that extends around the receptacle. Movement of the actuating ring is controlled by an actuating element in the form of a foot pedal. The foot pedal includes a ratcheting lever that engages a toothed rack. Pushing down on the foot pedal pushes downward on the ring, thereby pushing outward on the lower arms of the levers, pushing the upper arms inward to engage the tree. The ratchet lever and toothed rack hold the foot pedal in place after it has been depressed. Upward pressure on the ratchet lever releases the ratchet mechanism, permitting the levers to pivot so that their upper arms move outward, releasing the tree.

U.S. Pat. No. 5,464,186 discloses a vertical member support stand. The stand includes a generally cylindrical body having four outwardly extending support legs. Four upper pressure members and four lower pressure members are pivotally secured within the cylindrical body. Each of the pressure members includes a mounting end and a vertical member engaging end. The mounting end includes the mounting aperture and a gear segment along its peripheral edge. The vertical member engaging end has projecting teeth. Locking members are pivotally secured to the tree stand adjacent to the gear segments of the pressure members. Each of the locking members may be pivoted towards an engaged position wherein it engages the gear segment of a pressure member, thereby locking the pressure member in place, and a disengaged position wherein the pressure members are permitted to rotate. When a tree is inserted into the stand, the lower pressure members are pushed downward into engagement with the tree. The upper pressure members are then placed into contact with the tree trunk. The pressure members may then be locked in place.

DE 20 2005 006 285 discloses a Christmas tree stand having a conical holder and supporting legs. The legs extend upward to engage a tree trunk. The lower end of the legs include roller bearings. When a tree is placed in the stand, the weight of the tree causes the legs to spread outward, thereby causing the top of the legs to press against the tree trunk.

U.S. Pat. No. 4,130,965 discloses a tree stand. The tree stand includes a hemispheric base having a plurality of channels defined therein. Curved legs are retained within each of the channels. The legs are connected to a central reservoir. Placing a tree trunk into the central reservoir pushes down on the central reservoir, thereby pushing the curved legs against the tree trunk. When removal of the trees desired, the tips of the legs can be withdrawn from the trunk by gripping each individually, and pulling them away while the tree is lifted.

U.S. Pat. No. 3,136,514 discloses a Christmas tree stand. The Christmas tree stand includes a pan to which three pivotally mounted supports are secured. An arm is pivotally secured to the same pivot as each of the supports. Each of the arms includes a threaded fastener that can be manually turned to engage the tree trunk.

U.S. Pat. No. 6,023,882 discloses a Christmas tree stand cover. The cover includes a plurality of identical arcuate segments, with each segment having a uniform thickness wall and an integral flange for securing the segments together to form joints. Snap fasteners are utilized to secure the flanges together.

Other tree stands include U.S. Pat. No. D590,295, which discloses a Christmas tree stand having multifaceted, flat sides, and U.S. Pat. No. D330,346, which discloses a generally cylindrical Christmas tree stand that is held up by three legs.

As the above descriptions show, many designs rely on various cable mechanisms to secure the object within the stand, which places stress on the cable throughout the entire time during which the object is held, and could potentially result in wear on the cable as it rubs against the cable guides during loosening and tightening of the cable. Some designs require the manipulation of individual fasteners, necessitating two people to install or remove a tree.

Accordingly, there is a need for a stand for Christmas trees and other elongated objects that permits a single person to install and remove the elongated object. There is a further need for a simplified mechanism for retaining the elongated object within the stand. There is an additional need for a mechanism that is simple, durable, and easy to manufacture.

SUMMARY

The above needs are met by a stand for elongated objects. The stand includes a support surface and a plurality of arm assemblies secured approximately equiangularly about the support surface. Each arm assembly has an arm base having a first end movably secured adjacent to the support surface, and a second end. Each arm assembly also has a gripping arm having an upper arm portion, a lower arm portion, and a pivot point therebetween. The pivot point is pivotally secured to the second end of the arm base. The upper arm extends upward from the second end of the arm base, and has an upper elongated object engaging end. The lower arm portion extends from the second end of the arm base towards the center of the stand, and has an elongated object engaging surface. The arm assembly includes a first spring that is structured to bias the second end of the arm base towards the center of the stand, and a second spring that is structured to bias the lower arm portion towards the center of the stand.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
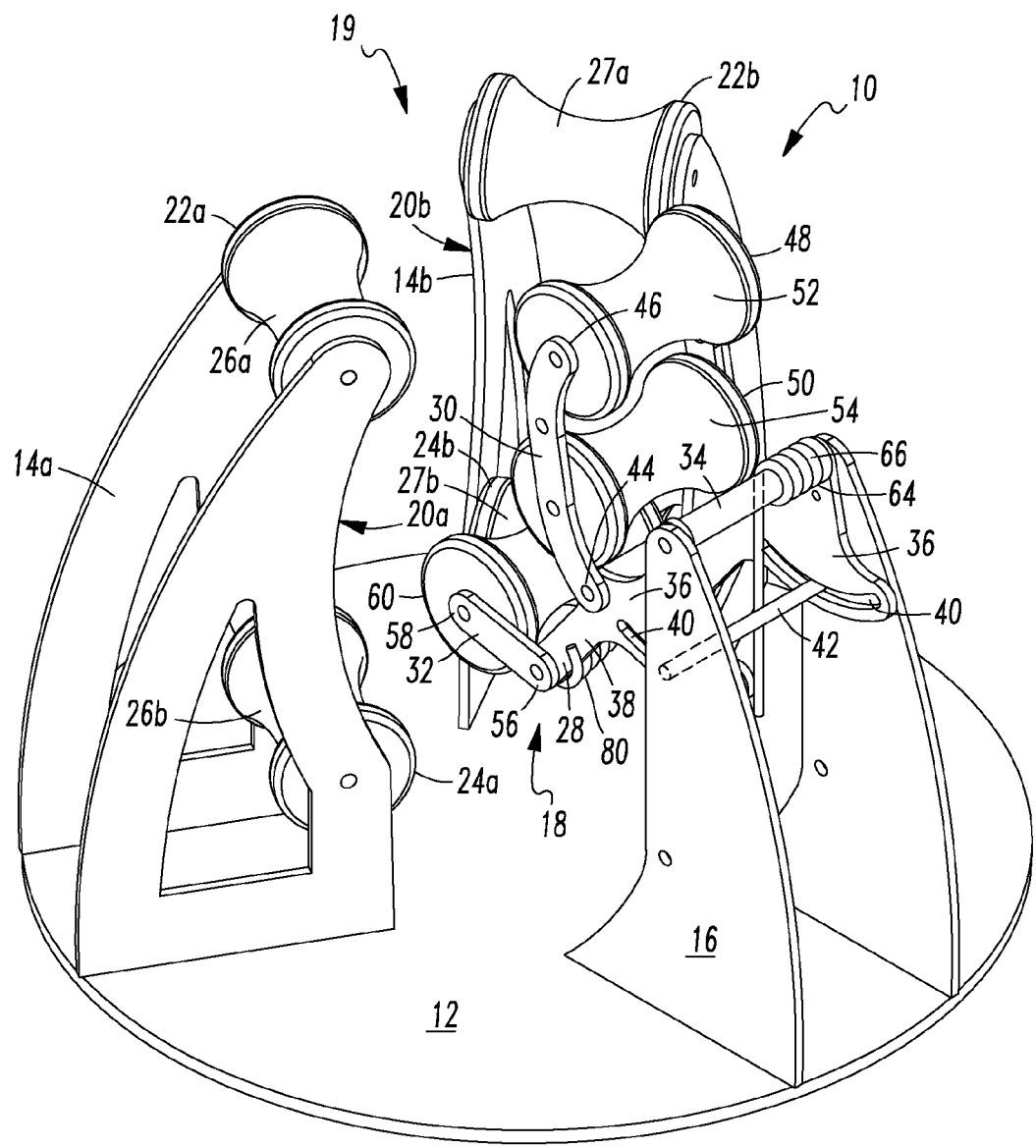
FIG. 1 is a perspective view of a stand for elongated objects.
Figure 2:
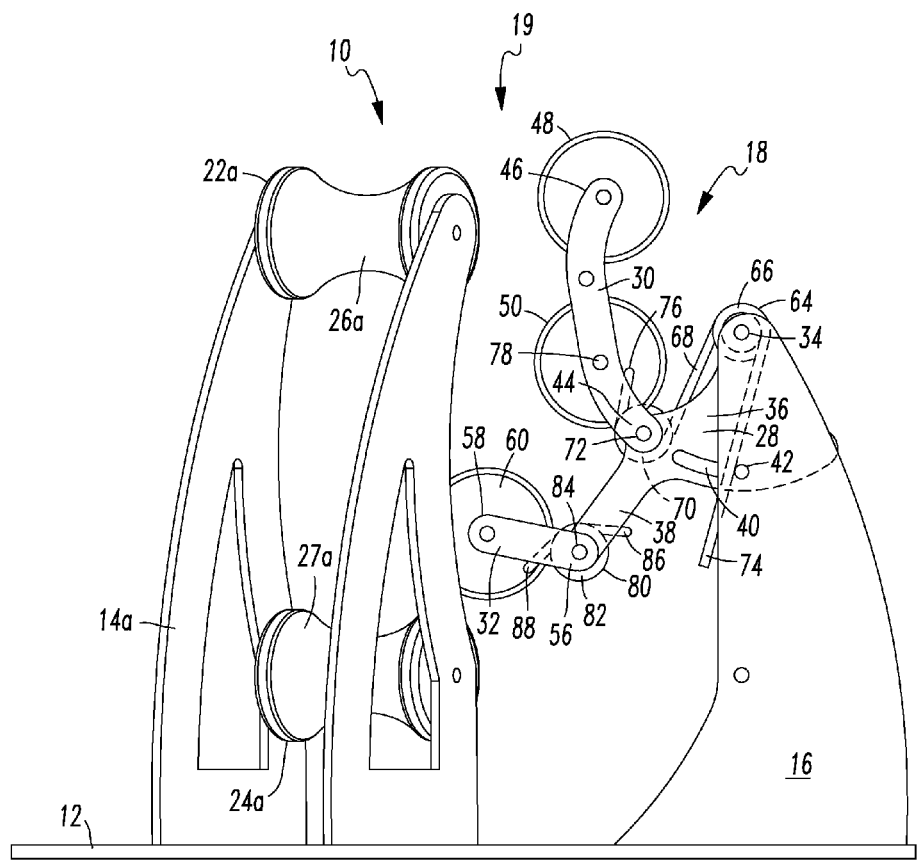
FIG. 2 is a side elevational view of the stand for elongated objects of FIG. 1.
Figure 3:
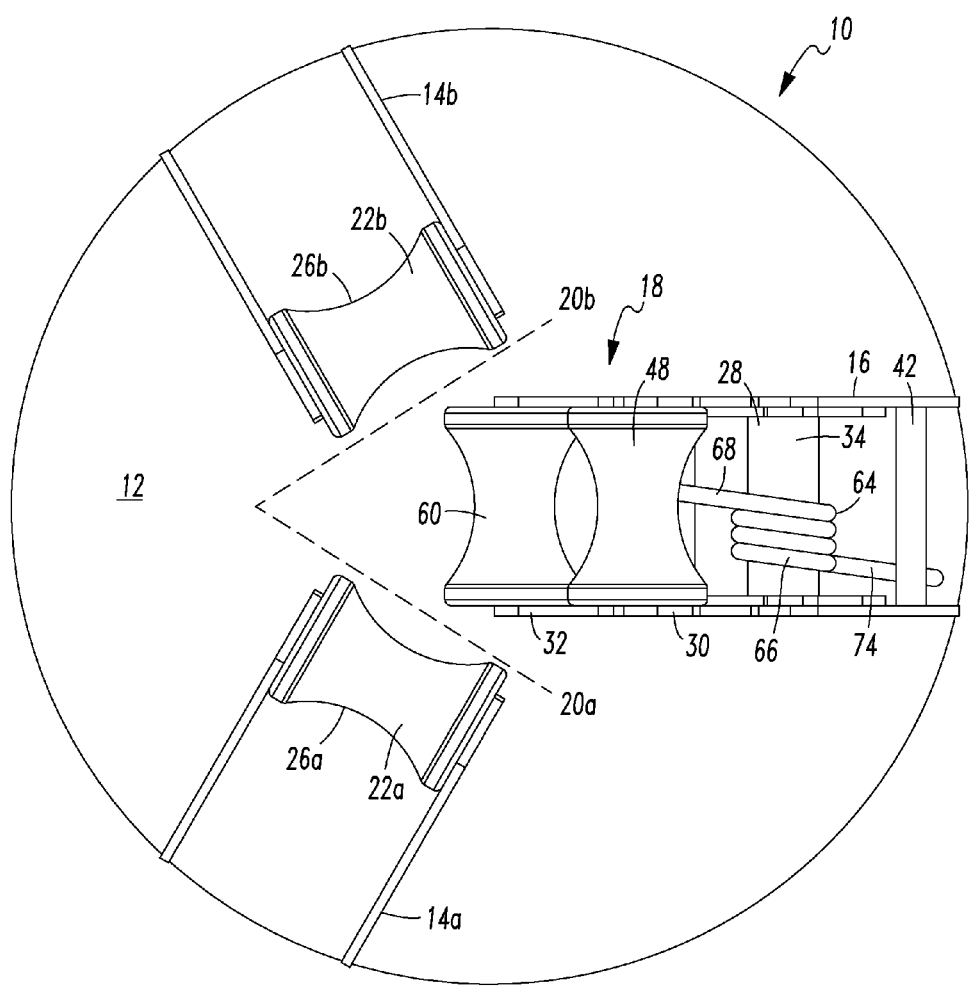
FIG. 3 is a top plan view of the stand for elongated objects of FIG. 1.

Referring to the drawings, a stand 10 for elongated objects such as Christmas trees is illustrated. Referring to FIGS. 1-3, the stand 10 includes a base 12, which in the illustrated example is generally flat when viewed from the side, and generally circular when viewed from the top. The stand 10 further includes at least one fixed arm 14 extending upward from the base 12, and in the illustrated example includes a pair of fixed arms 14a and 14b. An arm brace 16 supporting a movable arm assembly 18 also extends upward from the base 12. A center 19 of the stand 10 is defined above the base 12, and between the fixed arms 14a, 14b and arm brace 16.

In the illustrated example of the stand 10, the two fixed arms 14a, 14b each define an elongated object engaging sides 20a, 20b (FIG. 3). The elongated objects engaging sides 20a, 20b form an angle with respect to each other, with the angle being less than 180°, so that an elongated object such as a Christmas tree that is pushed into engagement with the fixed arms 14a, 14b will tend to be substantially centered between the fixed arms 14a, 14b. In the illustrated example, the fixed arms 14a, 14b and arm brace 16 are disposed about 120° apart from each other around the periphery of the base 12. Thus, the angle formed by the elongated object engaging sides 20a, 20b is also about 60° in the illustrated example.

The illustrated example of the stand 10 also includes at least one roller on each of the fixed arms 14. In the illustrated example, each of the fixed arms 14a, 14b includes an upper roller 22a, 22b and a lower roller 24a, 24b, respectively. In the illustrated example, each of the rollers 22a, 22b, 24a, 24b defines a concave curved surface 26a, 26b, 27a, 27b, respectively. In the illustrated example, the radius of the concave curved surfaces 26a, 26b, 27a, 27b is selected to generally correspond with the radius of a typical Christmas tree trunk.

The arm brace 16 in movable arm assembly 18 are the components that supply the force which retains the elongated objects within the stand. The movable arm assembly 18 is pivotally secured to the arm brace 16 by the pivot 34, which in the illustrated example is disposed at the top of the arm brace 16. In the illustrated example, the arm assembly 18 includes a base arm 28, and upper arm 30, and a lower arm 32. The base arm 28 includes a generally triangular proximal end 36, and a distal end 38. In the illustrated example, a slot 40 is defined within the triangular proximal end 36. A guide rod 42 forming a portion of the arm brace 16 fits within the slot 40, constraining the pivoting motion of the base arm 28 to a position closest to the center 19 of the stand 10, and a position farthest from the center 19 of the stand 10.

The upper arm 30 includes a proximal end 44 that is pivotally secured to a central portion of the base arm 28, and a distal end 46. In the illustrated example, a roller 48 is rotatably secured to the distal end 46, and a second roller 50 is rotatably attached to a central portion of the upper arm 30. The illustrated examples of the rollers 48, 50 each define a concave curved surface 52, 54, respectively. The radius of the concave surfaces 52, 54 generally corresponds to a typical radius for a Christmas tree trunk.

The lower arm 32 includes a proximal end 56 that is pivotally secured to the distal end 38 of the base arm 28, and a distal end 58. A roller 60 is rotatably secured to the distal end 58. The illustrated example of the roller 60 defines a concave curved surface 62, which in the illustrated example has a radius that generally corresponds to a typical radius of a Christmas tree trunk.

The arm assembly 18 is biased towards the center 19 of the stand 10. In the illustrated example of the arm assembly 18, the base arm 28 is biased away from the arm brace 16, towards the center 19. Similarly, the upper arm 30 is biased away from the arm brace 16 and towards the center 19. The lower arm 32 is also biased away from the arm brace 16, and generally in a direction away from the base 12. In the illustrated example, biasing of these components is accomplished utilizing a pair of springs. The spring 64 includes a first coil 66 that surrounds the pivot 34 connecting the arm brace 16 and movable arm assembly 18. A central connector 68 connects the first coil 66 to a second coil 70 which surrounds the pivot 72 connecting the base arm 28 to the upper arm 30. The spring 64 includes a proximal end 74 disposed against the guide rod 42, and a distal end 76 disposed against the axle 78 of the roller 50. The spring 64 of the service to bias base arm 28 and upper arm 30 away from the arm brace 16 and towards the center 19 of the stand 10. Similarly, a spring 80 includes a coil 82 surrounding the pivot 84 between the base arm 28 and a lower arm 32. The spring 80 includes a proximal and 86 disposed against a portion of the base arm 28, and a distal and 88, disposed against a portion of the lower arm 32. The spring 80 biases the lower arm 32 in a direction that is generally away from the arms race 16 as well is in a direction that is generally away from the base 12. In normal use of the stand 10, the bias of the lower arm 32 is in a generally upward direction.

Figure 7:
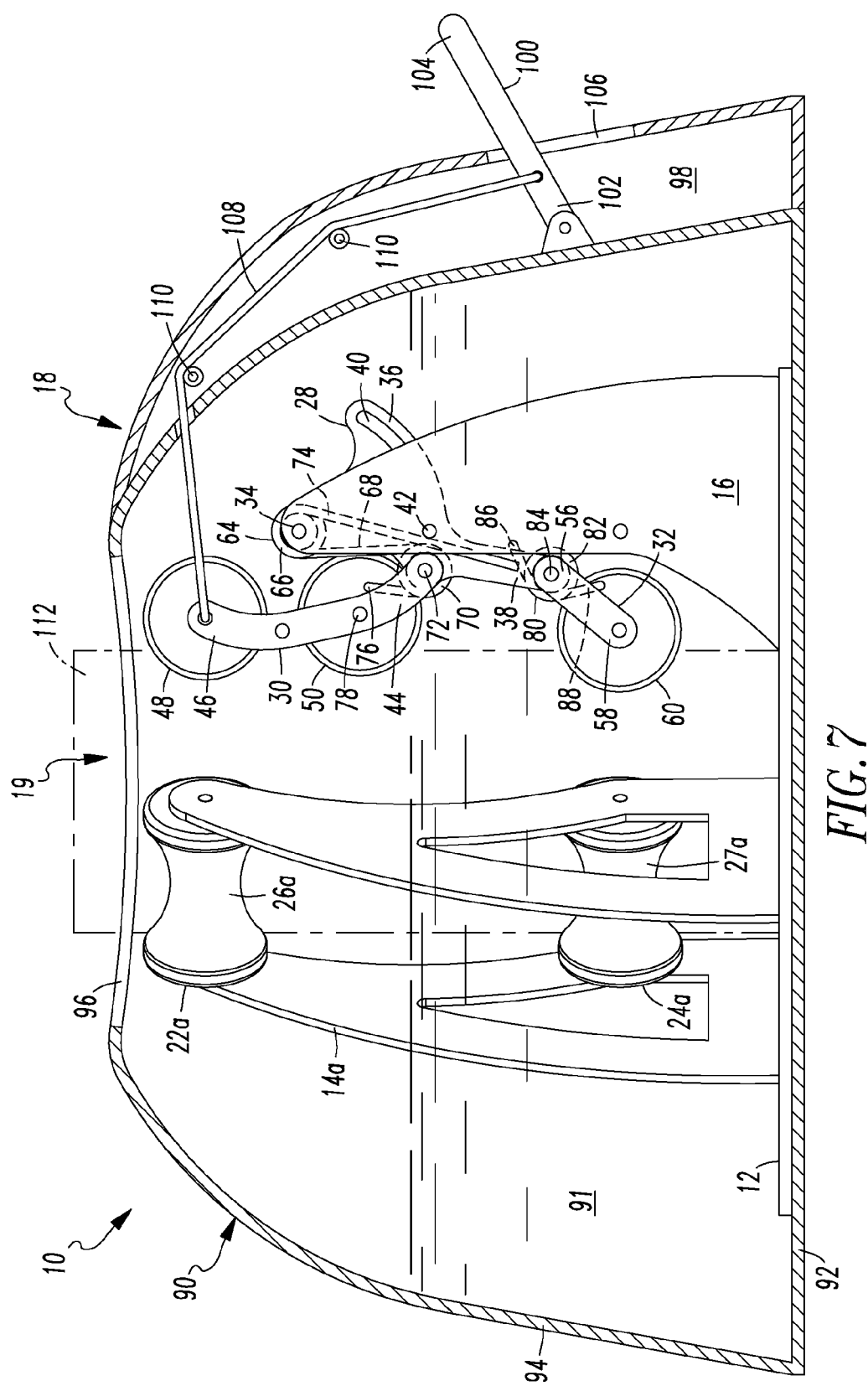
FIG. 7 is a partially cutaway side elevational view of the stand for elongated objects of FIG. 1, showing the exterior of the stand in cutaway format, and the elongated object completely installed within the stand.

Referring to FIG. 7, additional components of the stand 10 are shown. If the stand 10 is utilized as a Christmas tree stand, then an external housing 90 is desirable for containing water 91. The housing 90 includes a floor 92 which may optionally correspond to the base 12, at least one side wall 94 which in the illustrated example is generally round when viewed from the top, and generally tapered, narrowing towards the top, when viewed from the side. A top opening 96 is provided to accommodate the Christmas tree or other elongated object. Some examples of the housing 90 may also include screw adjustable feet to facilitate leveling the stand 10.

FIG. 7 also illustrates a release mechanism to facilitate removal of the Christmas tree or other elongated object. The housing includes a channel 98 within which the release mechanism is located. The channel 98 is preferably impervious to water with the exception of its open top end, so that as long as water is below its expected level within the stand, water is unlikely to enter the channel 98. The release mechanism includes a lever 100, which in the illustrated example is in the form of a foot pedal. The lever 100 includes a proximal end 102 that is pivotally secured to the housing 90 and within the channel 98, and a distal end 104 protruding through a slot 106 defined within the housing 90. A cable 108 extends from the lever 100 (in the illustrated example being attached near the proximal end 102, above the likely water level within the housing 90) to the distal end 46 of the upper arm 30, passing around one or more guides or pulleys 110. Depressing the lever 100 retracts the upper arm 34 reasons that will be explained below.

The stand 10 can be made from any materials having sufficient strength and rigidity. If the stand 10 is to serve as a Christmas tree stand, then imperviousness to water is also a desirable characteristic of the materials used to build the stand 10. A variety of metals may be used to make the various components of the stand 10, particularly if a rust resistant coating is applied to surfaces of the stand 10 that are anticipated to be in contact with water. Various plastics may also be utilized. The materials may also be selected to provide a decorative appearance to the housing 90.

Figure 4:
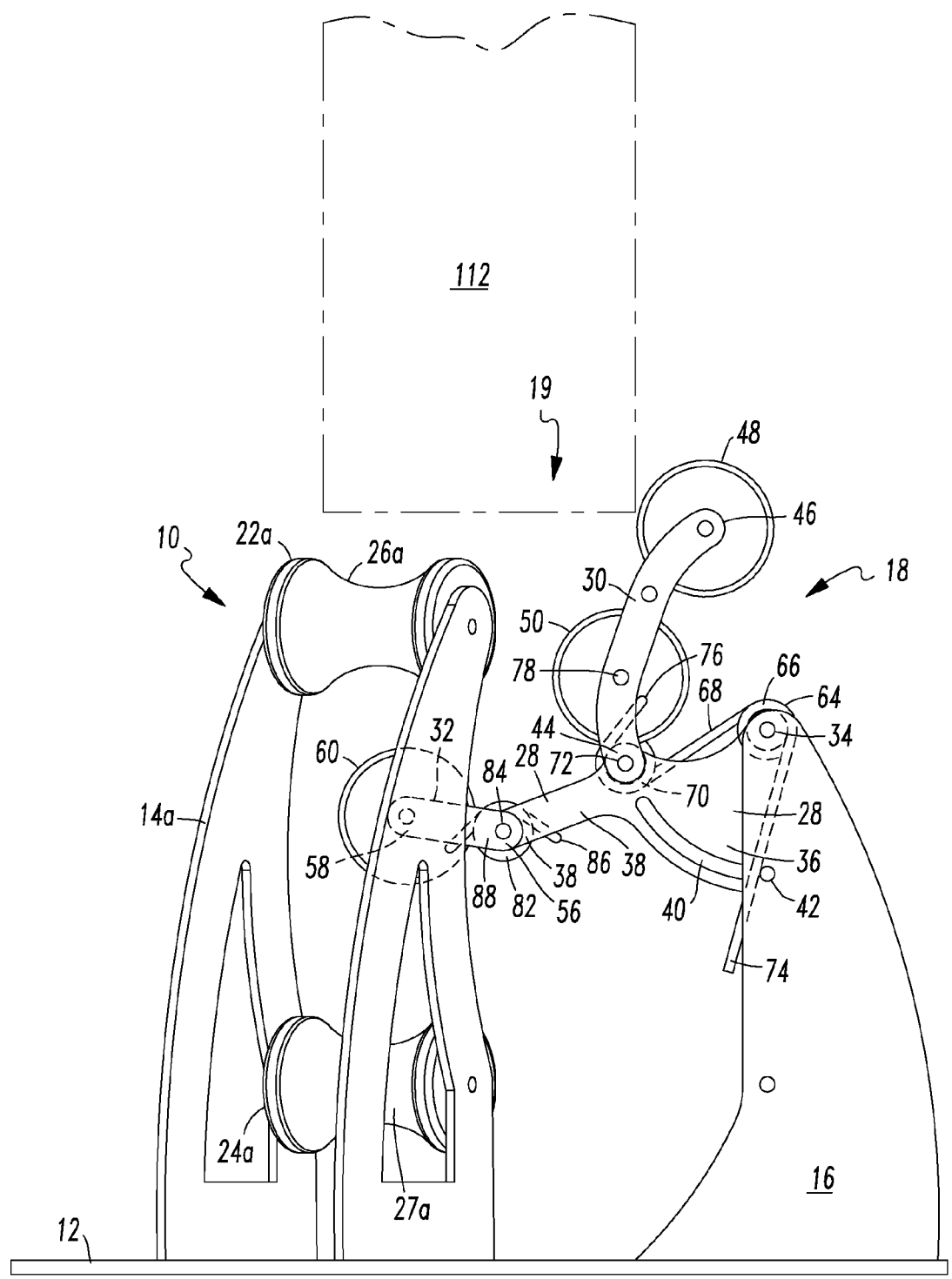
FIG. 4 is a side elevational view of the stand for elongated objects of FIG. 1, showing the first step of installing and elongated objects into the stand.
Figure 5:
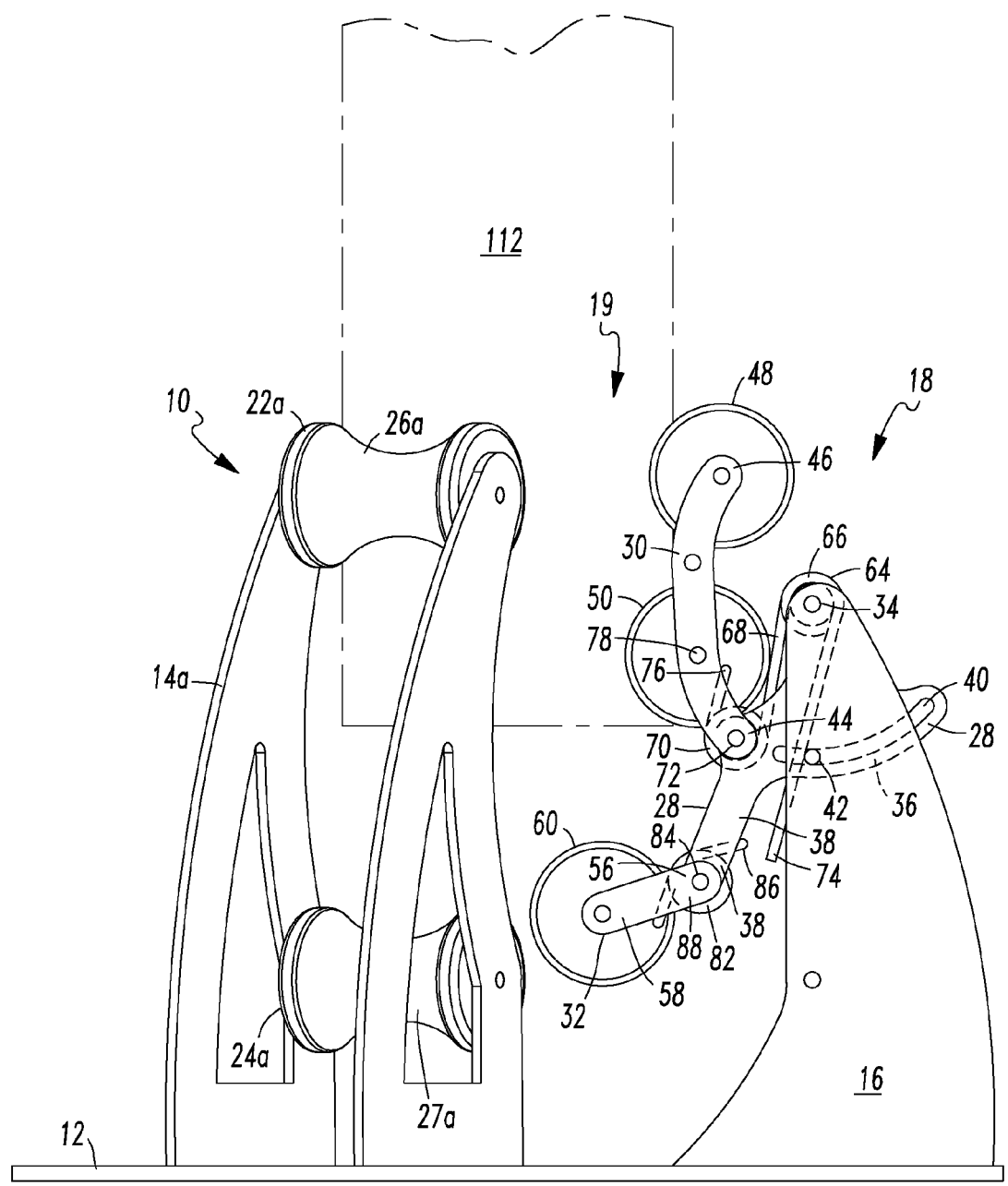
FIG. 5 is a side elevational view of the stand for elongated objects of FIG. 1, showing the second step of installing and elongated objects into the stand.
Figure 6:
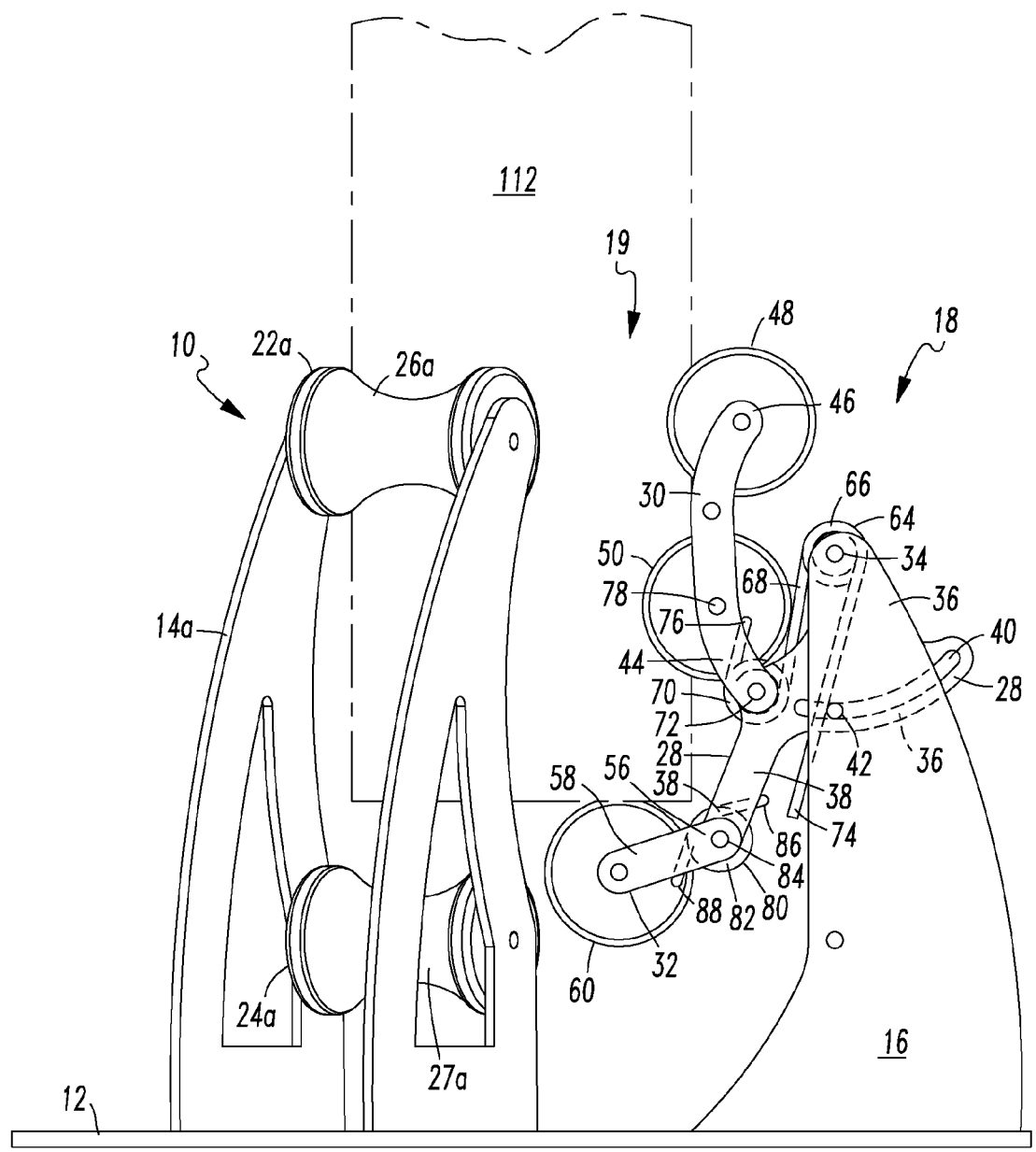
FIG. 6 is a side elevational view of the stand for elongated objects of FIG. 1, showing the third step of installing and elongated objects into the stand.

FIGS. 4-7 show the process of installing a Christmas tree or other elongated object within the stand 10. Initially, the Christmas tree trunk 112 is inserted downward into the center 19 of the stand 10. First, the Christmas tree 112 contacts the roller 48 of the upper arm 30 as well as the rollers. 22a, 22b, as shown in FIG. 4. Continued downward pressure by the tree trunk 112 pushes the arm assembly 18 towards the arm brace 16 as the as the tree trunk 112 contacts the roller 50 of the upper arm 30, as shown in FIG. 5. Continued downward movement of the tree trunk 112 causes the tree trunk 112 to contact the roller 60, pushing the lower arm 32 downward and towards the arm brace 16, as shown in FIG. 6. FIG. 7 shows the tree trunk 112 completely within the stand 10, at which point the stand 10 can be filled with water if desired. The spring pressure applied by the movable arm assembly 18 to the tree trunk 112, pushing the tree trunk 112 against the fixed arms 14a, 14b, is sufficient to securely hold a typically sized household Christmas tree in place. Throughout the process of installation, the weight of the Christmas tree assists in installing the Christmas tree trunk 112 into the stand 10.

Figure 8:
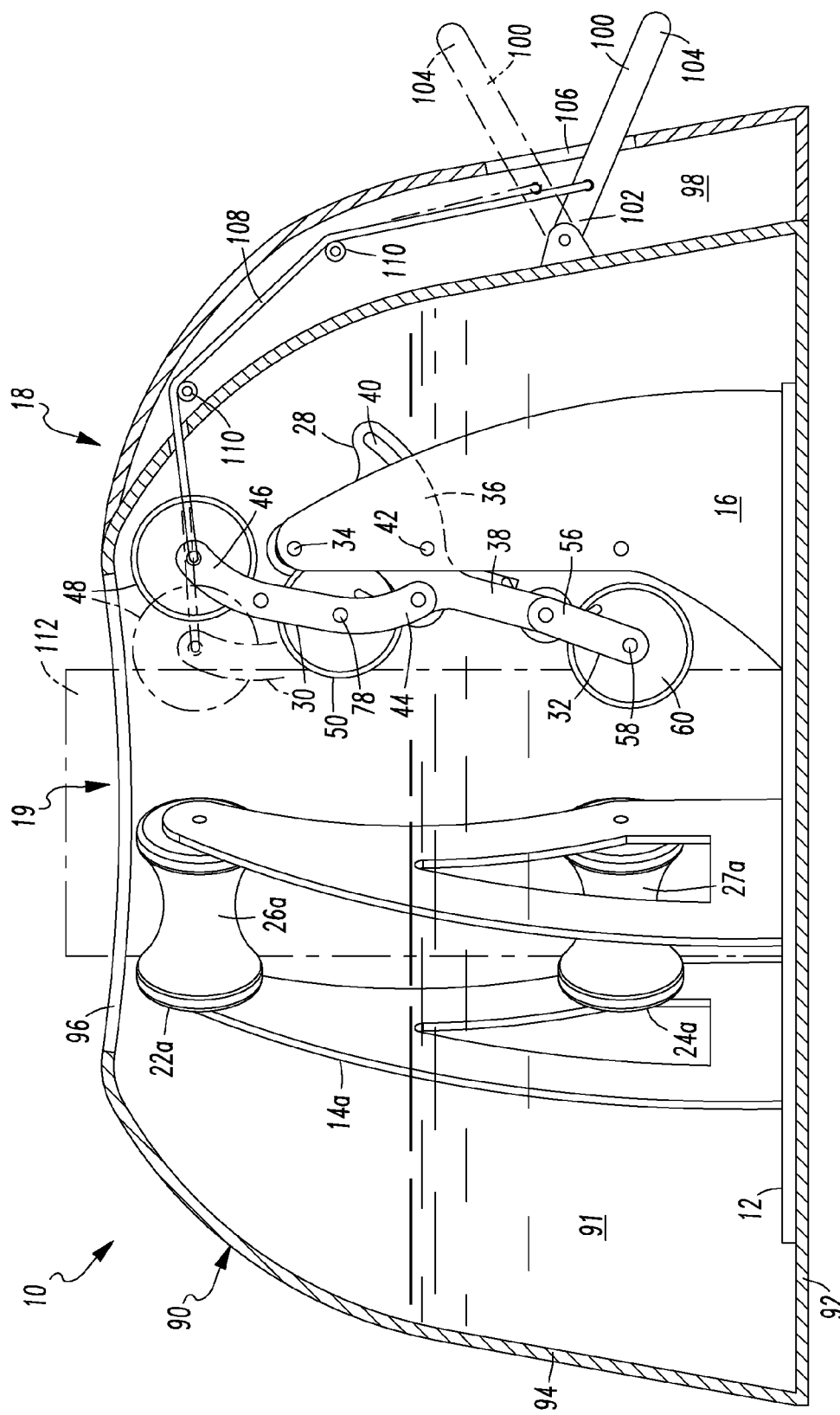
FIG. 8 is a partially cutaway side elevational view of the stand for elongated objects of FIG. 1, showing the exterior of the stand in cutaway format, and the first step of removing the elongated object from the stand.
Figure 9:
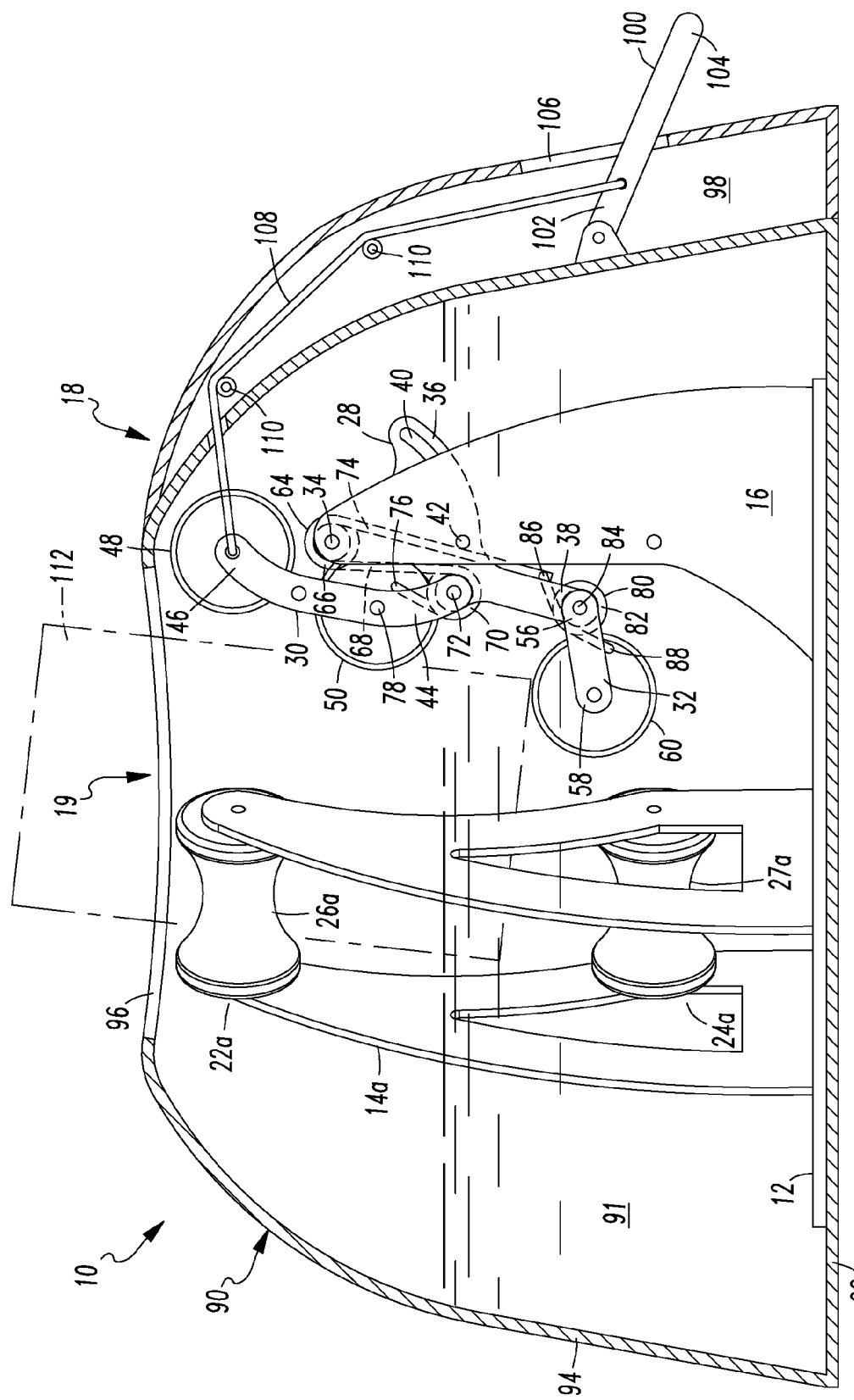
FIG. 9 is a partially cutaway side elevational view of the stand for elongated objects of FIG. 1, showing the exterior of the stand in cutaway format, and the second step of removing the elongated object from the stand.
Figure 10:
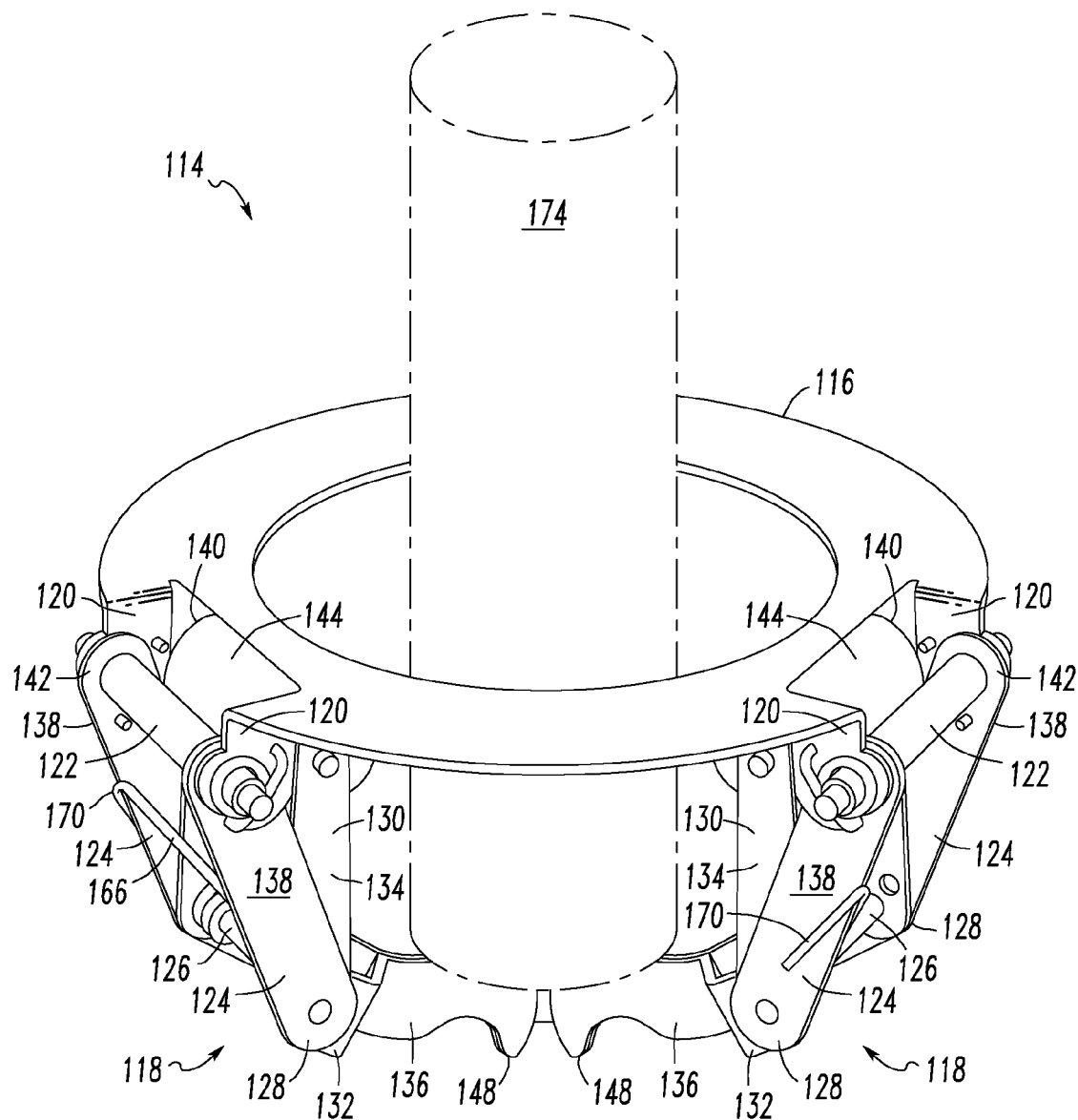
FIG. 10 is a perspective view of another stand for elongated objects, with the housing removed for clarity.
Figure 11:
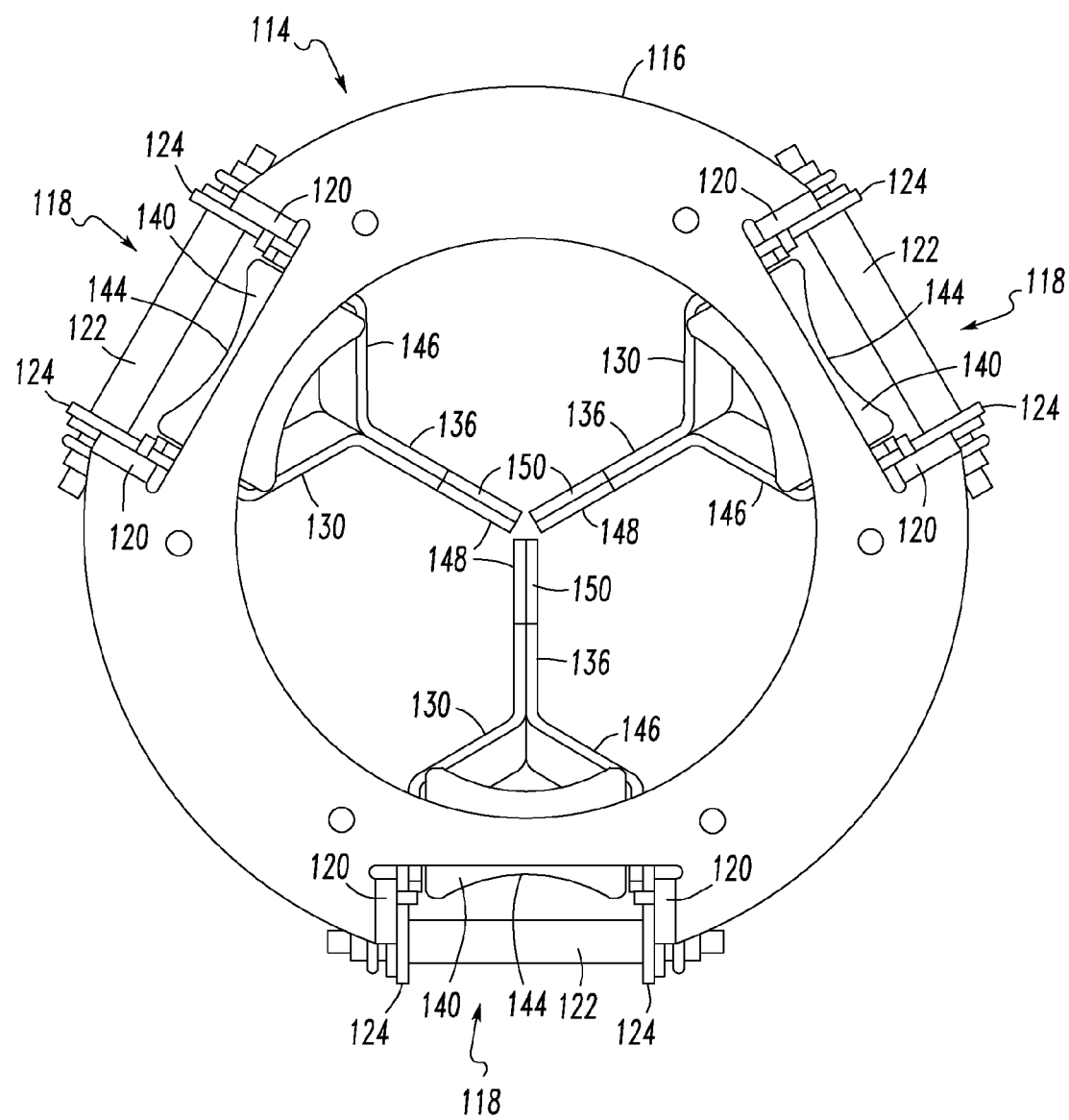
FIG. 11 is a top plan view of the stand for elongated objects of FIG. 10, showing the arms in their rest position.
Figure 12:
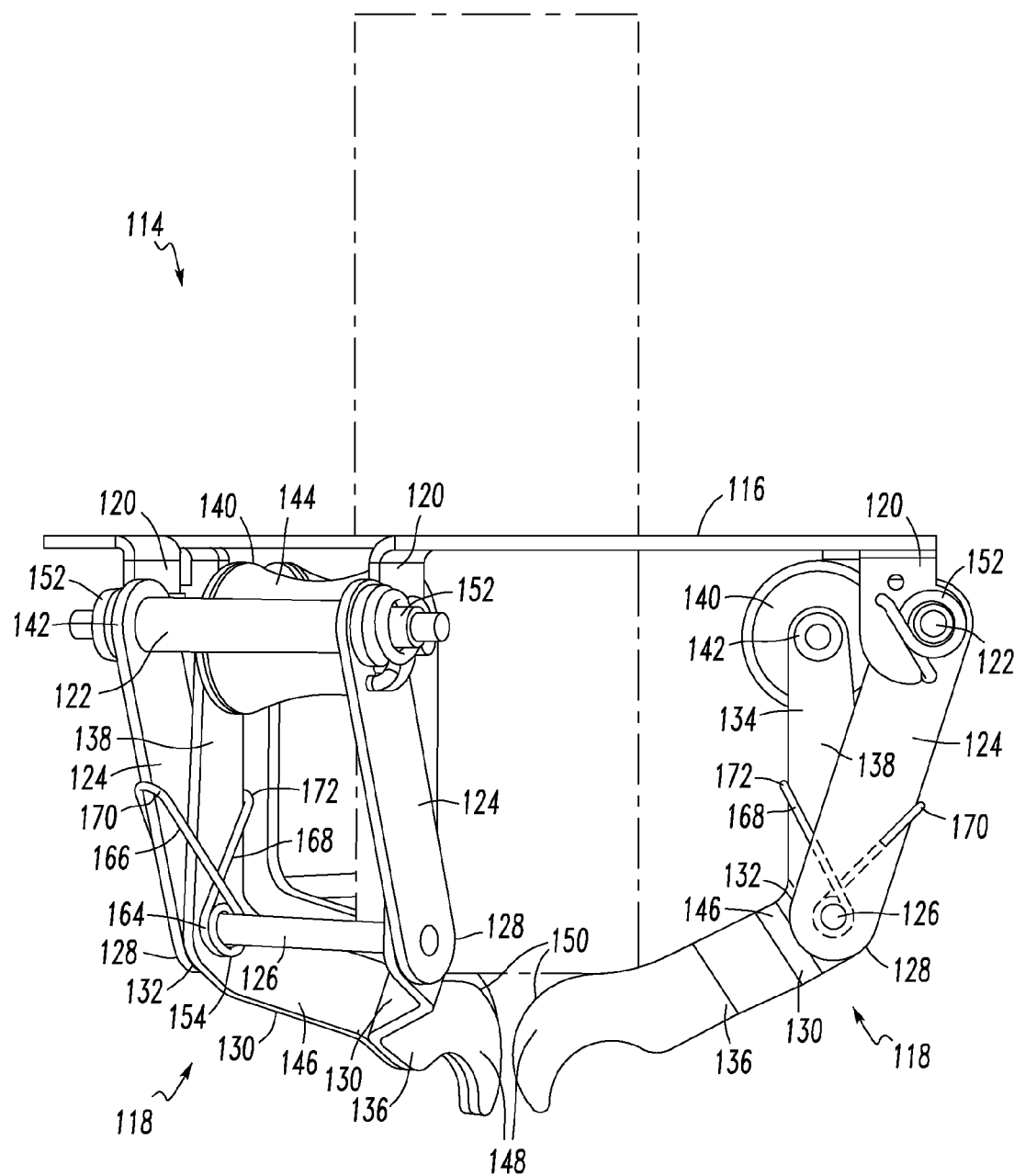
FIG. 12 is a side elevational view of the stand for elongated objects of FIG. 10, showing the arms in the rest position at the beginning of inserting an elongated object.
Figure 13:
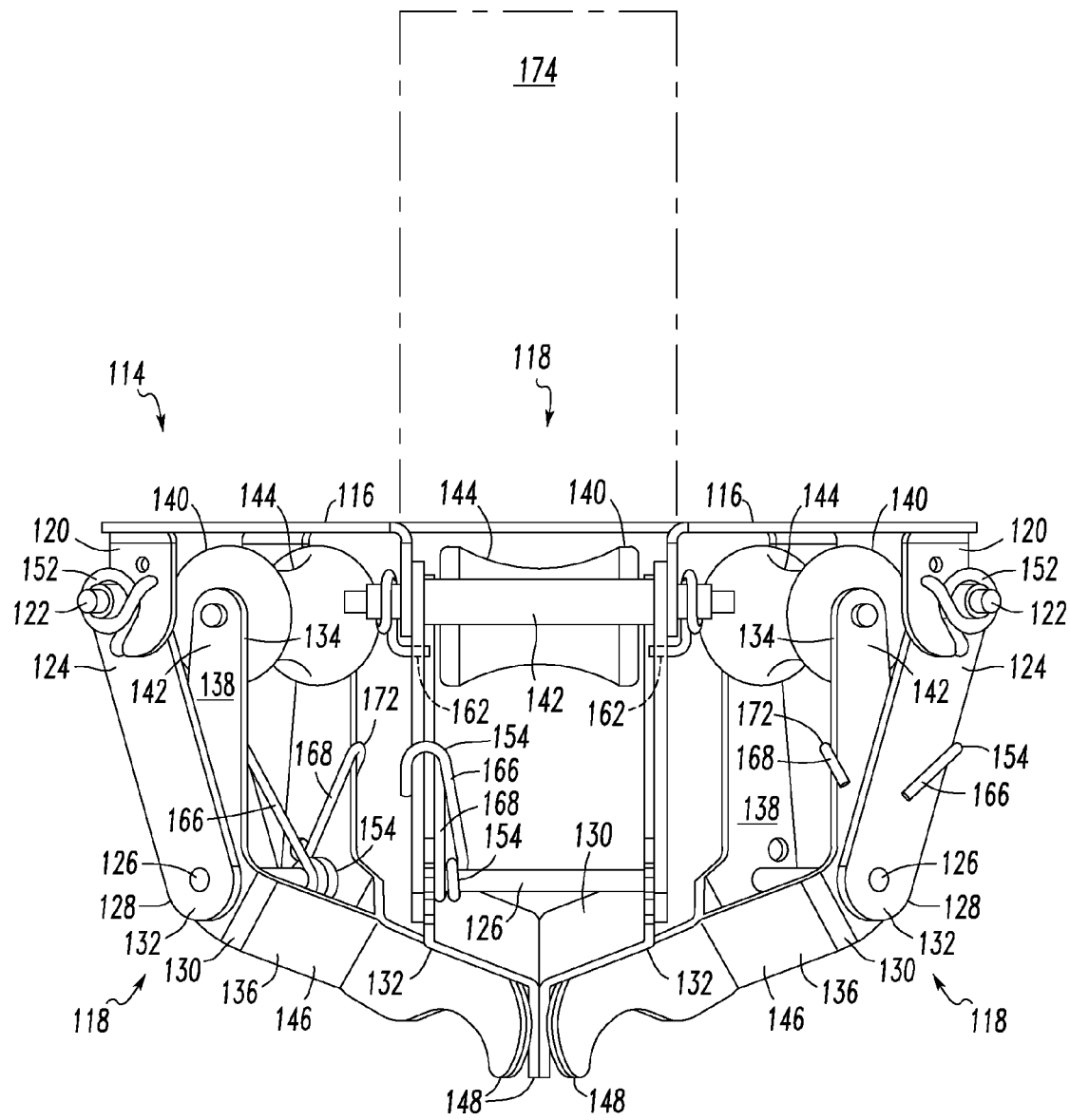
FIG. 13 is a front elevational view of the stand for elongated objects of FIG. 10, showing the arms in the rest position at the beginning of inserting an elongated object.

FIGS. 8-9 illustrate removal of the tree trunk 112 from the stand 10. The lever 100 is pushed downward by the user's foot, retracting the upper arm 30 from the tree trunk 112, as shown in FIG. 8. Next, the tree trunk 112 is tilted towards the arm brace 16, and lifted from the stand 10. During part of this lifting process, upward pressure applied to the tree trunk 112 by the lower arm 32 assists in pushing the tree trunk 112 out of the stand 10.

FIGS. 10-20 illustrate another example of a stand 114 for elongated objects. Referring to FIGS. 10-13, the stand 114 includes a support surface, which in the illustrated example is the top ring 116. The ring 116 is secured to a housing which can be the same or similar to the housing illustrated in the example of FIGS. 1-9, and which has been omitted from the drawings for clarity. The ring 116 includes a plurality of pivotally secured arm assemblies 118, with the illustrated example including three arm assemblies 118. The arm assemblies 118 are distributed approximately equiangularly about the support surface, with the illustrated examples of the arm assemblies being about 120 degrees apart along the ring 116. In the illustrated example, the ring 116 includes three pairs of downwardly extending flanges 120, with each pair of flanges 120 securing a pivot rod 122 therebetween. A pair of downwardly extending arm base portions 124 are pivotally secured to each pivot rod 122, with each arm base portion 124 being adjacent to a flange 120. Another pivot rod 126 is secured between the lower ends 128 of each pair of arm bases 124.

A gripping arm, which in the illustrated example is an L-shaped arm 130, is pivotally secured to each pivot rod 126, with the pivot rod 126 passing through apertures defined at the intersection 132 of the upper arm portion 134 and lower arm portion 136. For the purpose of this description, an L-shaped arm may include two arm portions that are either angled with respect to each other or which are substantially perpendicular to each other. The illustrated example of the upper arm portion 134 includes a pair of upwardly extending arms 138 having a roller 140 rotatably secured between the upper ends 142 each pair of upwardly extending arms 130. In the illustrated example, the roller 140 defines a concave surface 144. The radius of the concave surface 144 is generally equal to or greater than the radius of the elongated object for which the stand 114 is intended to be utilized. However, use of the stand 114 with an elongated object having a radius greater than the radius of the concave surface 144, or a V-shape rather than the illustrated curved shape (which is still considered to be concave for the purpose of this description), would not depart from the scope of the invention.

In the illustrated example, the lower arm portions 136 are generally Y-shaped, having upper ends 146 extending downward from each upper arm 138, and a lower portion 148 defining a convex surface 150 that is structured to abut an elongated object that is installed within the stand 114. As described in greater detail below, it will become apparent that an elongated objects pushing downward against the convex surfaces 150 will cause the rollers 140 to be brought into contact with the elongated object.

Figure 14:
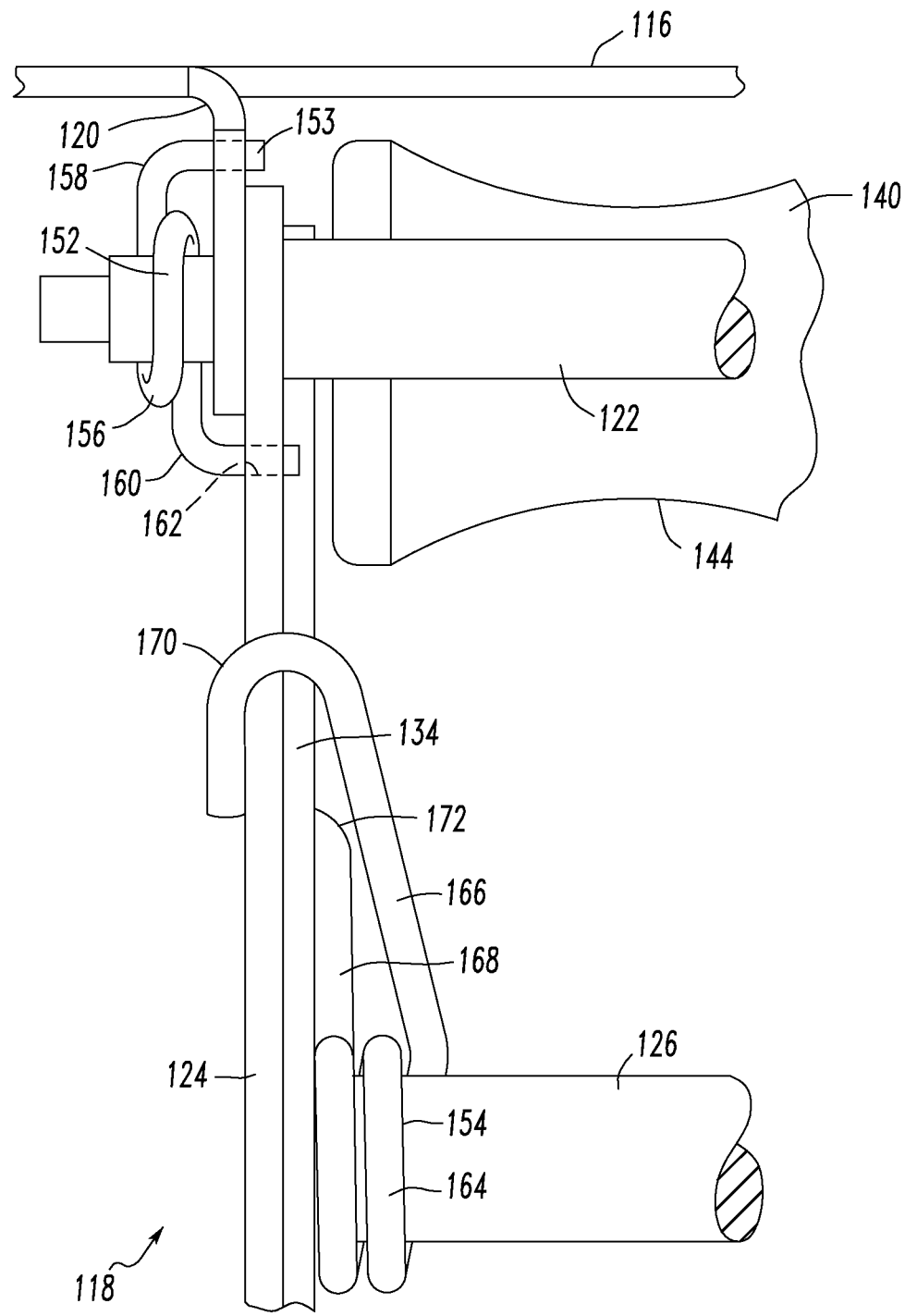
FIG. 14 is a front elevational view of a portion of an arm for the stand for elongated objects of FIG. 10, showing the springs for the arm.
Figure 15:
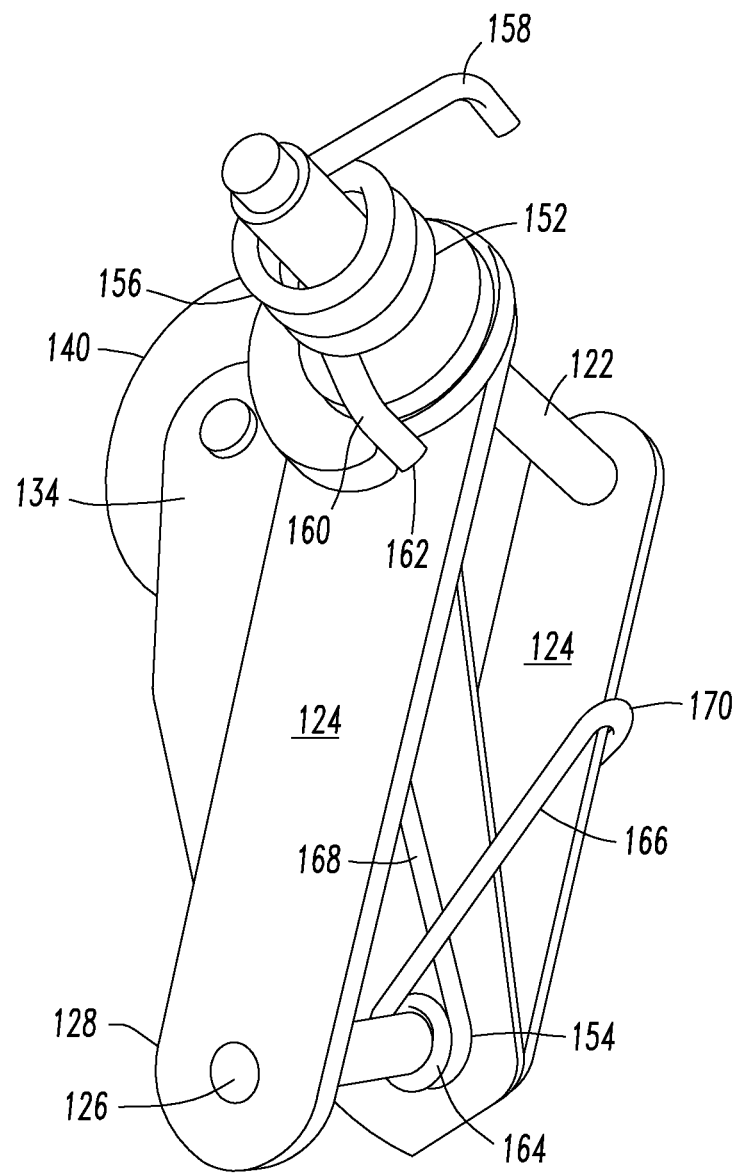
FIG. 15 is a side elevational view of a portion of an arm for the stand for elongated objects of FIG. 10, showing the springs for the arm.

Referring to FIGS. 14-15, the springs for the arm assemblies 118 are illustrated. Each arm assembly 118 includes two springs: an upper spring 152 for biasing the arm base 124 with respect to the ring 116, and a lower spring 154 for biasing the L-shaped arm 130 with respect to the arm base 124. The illustrated example of the upper spring 152 is a coil spring, having a central coil 156 surrounding the pivot pin 122. One end 158 of the spring 152 fits within an aperture 153 defined within the flange 120. The other end 160 of the spring 152 engages the arm base 124, in the illustrated example being secured within an aperture 162 defined within the arm base 124. The upper spring 152 biases the arm base 124 so that lower end 128 of the arm base 124 is biased towards the center of the stand 116.

The lower spring 154 is also a coil spring, having a central coil 164 that wraps around the pin 126. A pair of spring arms 166, 168 extend upward from the coil 164. The spring arm 166 extends upward towards a bend 170 that wraps around the arm base 124. The spring arm 168 extends upward towards a bend 172 that wraps around the upper arm portion 138. The lower spring 154 of us biases the roller 144 towards the pivot 122, simultaneously biasing the lower portion 148 of the lower arm portion 136 towards the center of the stand 114. Thus, the arm assemblies 118 are in the position shown in FIGS. 10, 11, 12, and 13 in the absence of an elongated object within the stand 114.

Figure 16:
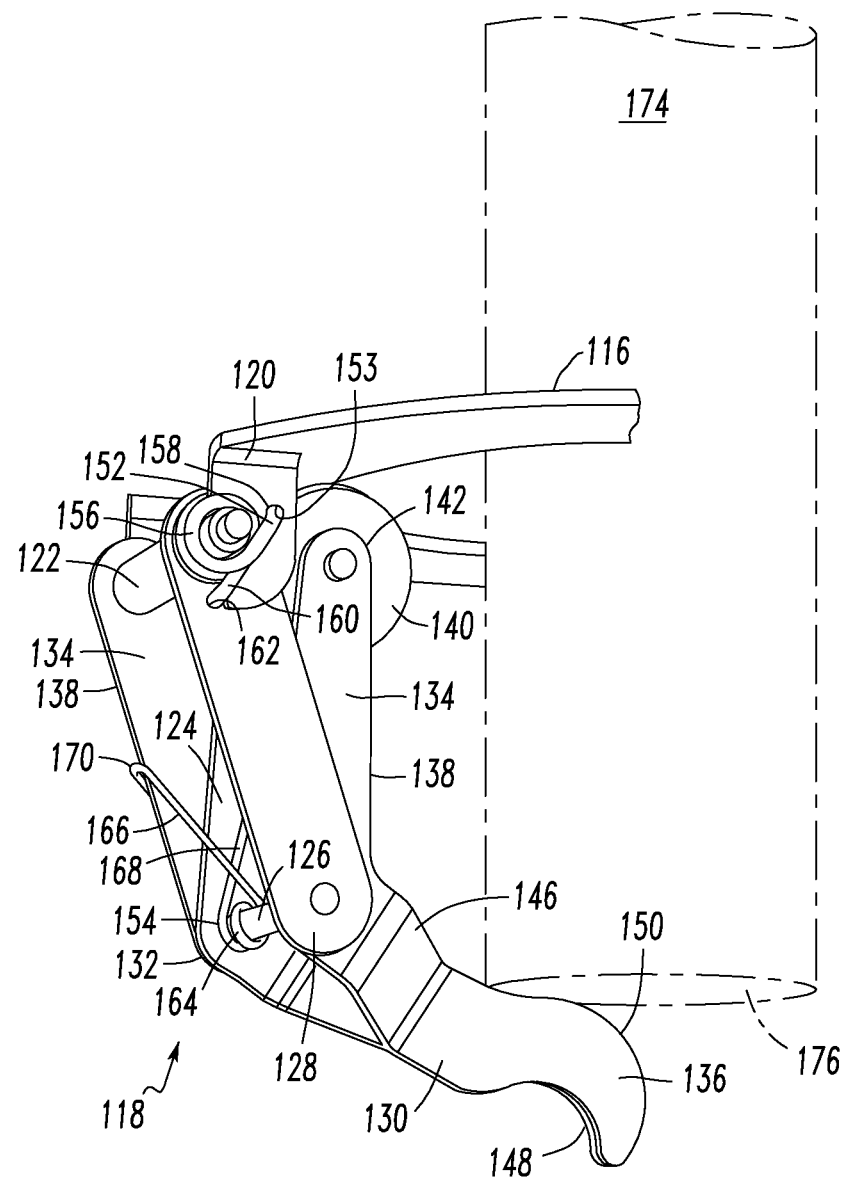
FIG. 16 is a partially cutaway perspective view of a stand for elongated objects of FIG. 10, showing an elongated object pushing down on the bottom portion of an arm.
Figure 17:
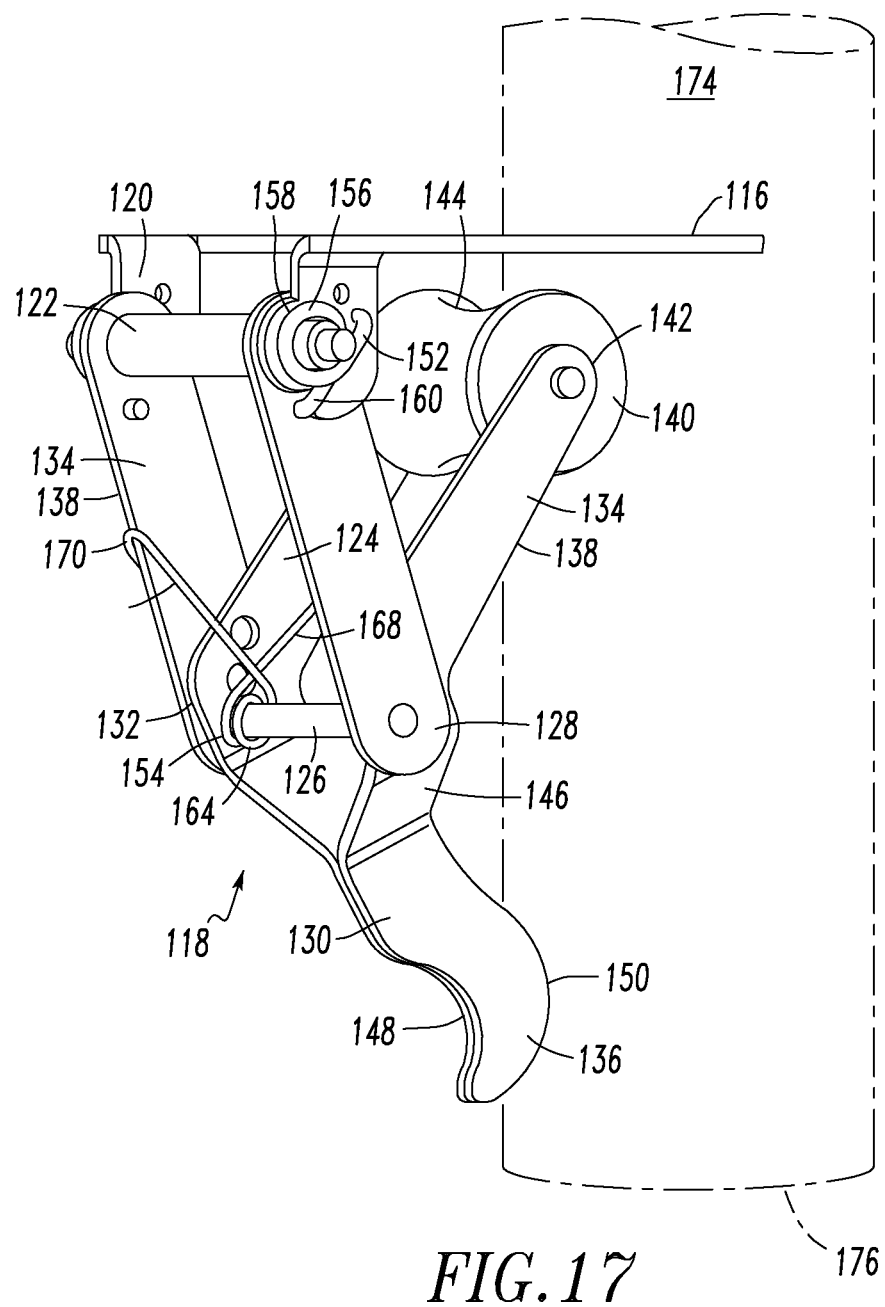
FIG. 17 is a partially cutaway perspective view of a stand for elongated objects of FIG. 10, showing the position of an arm when an elongated object has been fully inserted into the stand.
Figure 18:
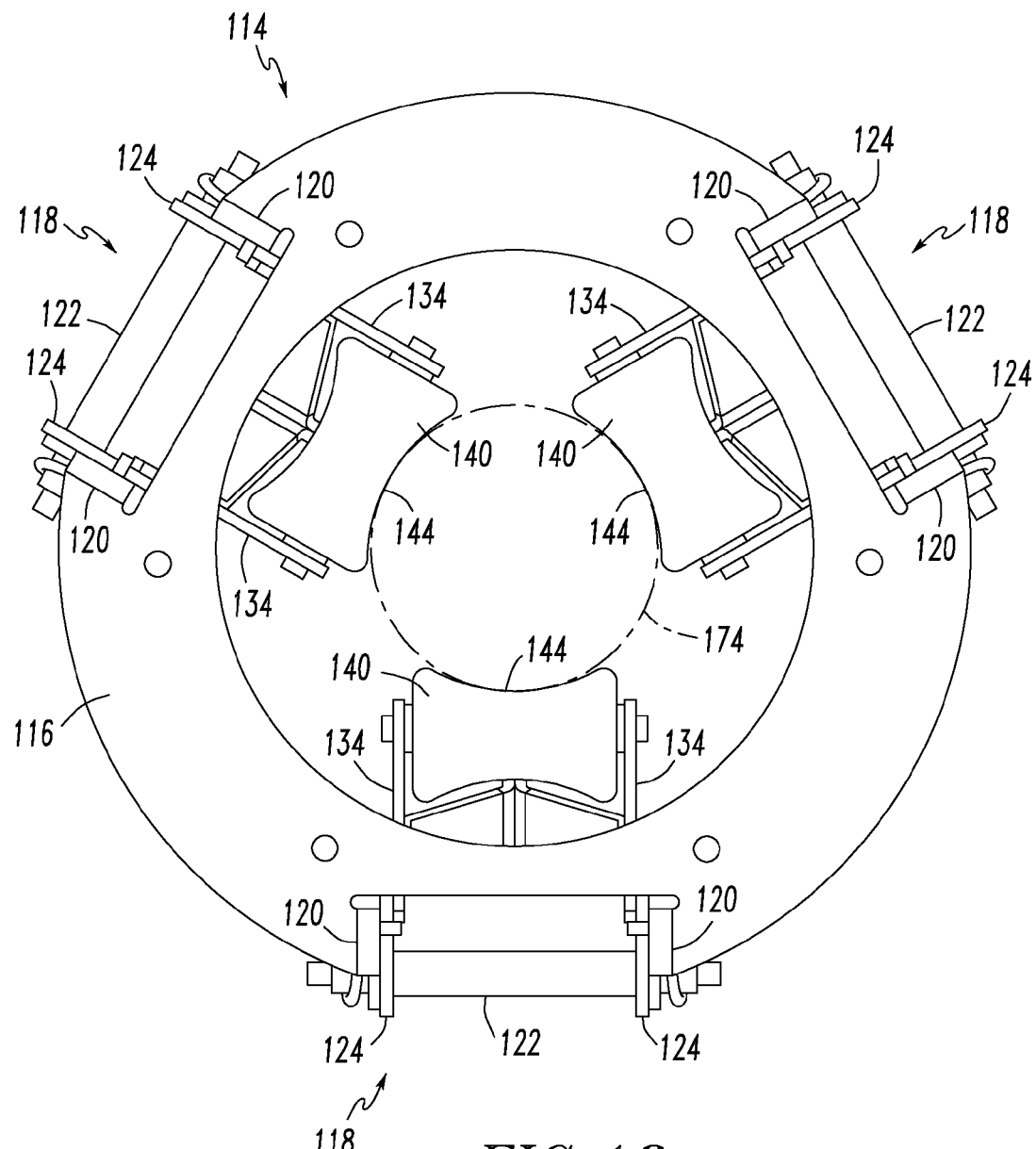
FIG. 18 is a top plan view of the stand for elongated objects of FIG. 10, showing an elongated object fully inserted into the stand.

Referring to FIG. 16, an elongated object 174 is being inserted into the stand 114. The bottom surface 176 contacts the convex surface 150, pushing down on the lower arm portion 136. The upper arm portion 134 is thus pushed towards the elongated object 174, until the roller 140 is brought into contact with the elongated object 174, as shown in FIG. 17. The elongated object 174 is pushed farther down into the stand 114 until it contacts the bottom of the stand 114. At this point, the concave surfaces 144 of all three rollers 140, as well is all three convex surfaces 150 of each lower arm portion 136, is being pressed against the elongated object 174 by the springs 152, 154, as shown in FIG. 18. A thicker elongated object 174 will compress the springs 152 to a greater extent, thus causing the springs 152 to apply a greater force to push the arm assemblies 118 towards the elongated object 174. Thus, a thicker, and presumably heavier elongated object 174 will be retained with a greater amount of force.

Figure 19:
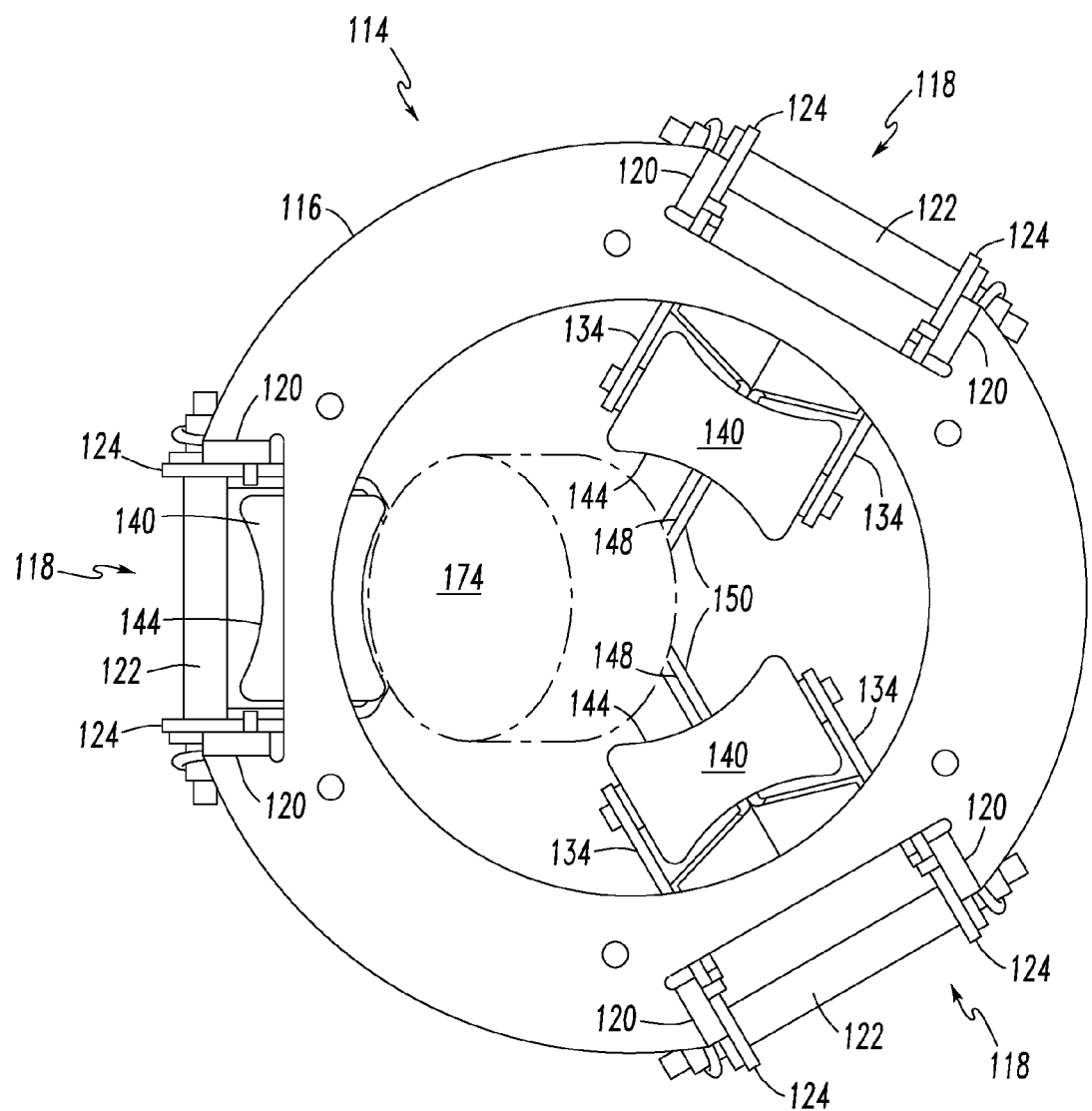
FIG. 19 is a top plan view of the stand for elongated objects of FIG. 10, showing the elongated object being tilted for removal from the stand.
Figure 20:
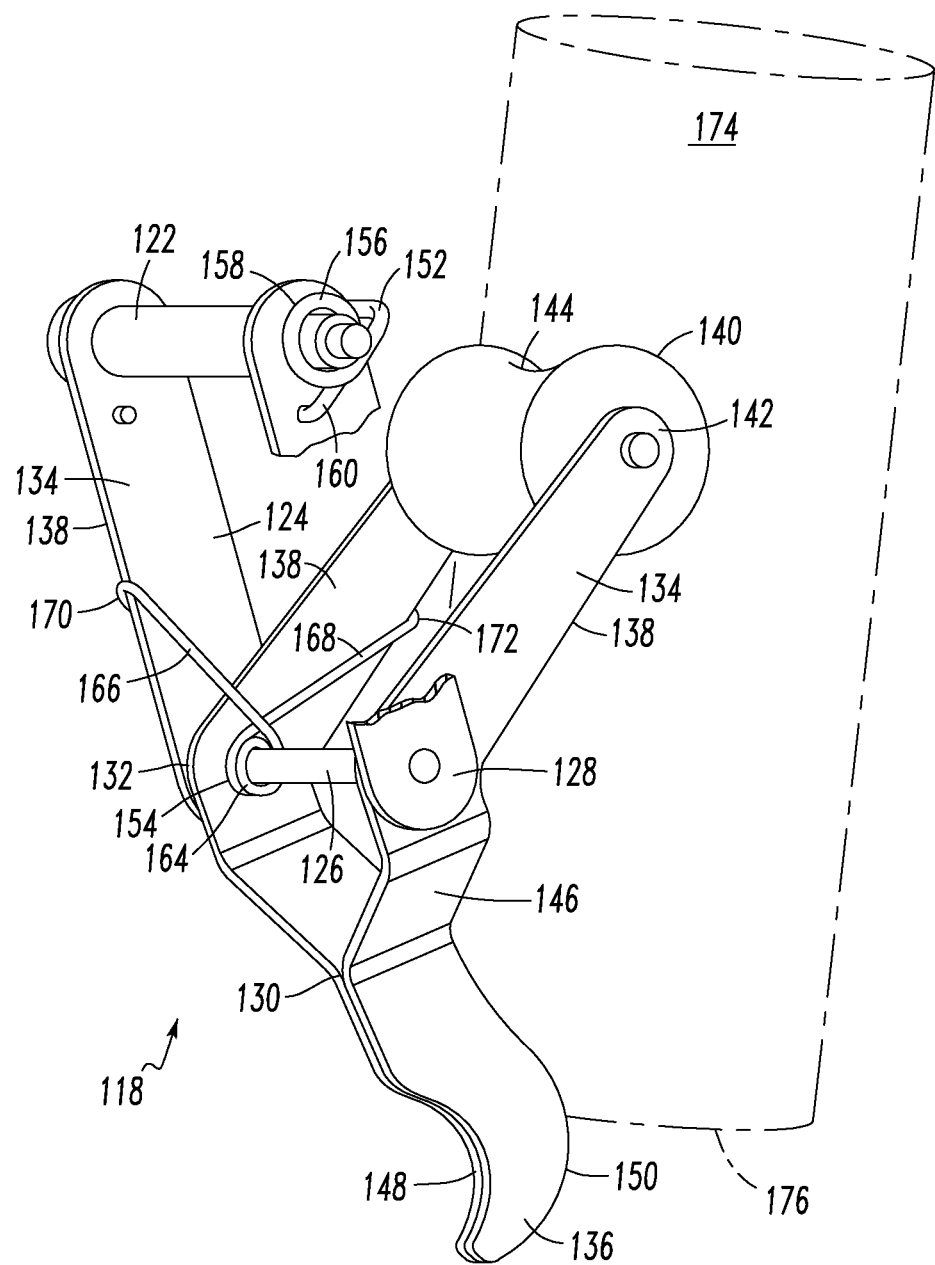
FIG. 20 is a partially cutaway perspective view of a stand for elongated objects of FIG. 10, showing the elongated object partially removed from the stand.

To remove the elongated object 174 from the stand 114, the elongated object 174 can first be tilted as shown in FIG. 19. Tilting the elongated object 174 disengages two of the three rollers 140 from the elongated object 174, thus reducing resistance to removing the elongated object 174 from the stand 114. As the elongated object 174 is lifted from the stand 114, the convex surface 150 of the lower end of 148 of the lower arm portion 136 is biased at least partially against the bottom surface 176 of the elongated object 174. At this point, the bias of the springs 152, 154 provides an upward force that facilitates completing the removal of the elongated object 174 from the stand 114.

An elongated object with which examples of the stand 114 may be utilized is the trunk of a Christmas tree. Thus, a single individual may install a Christmas tree into the stand 114 with greater ease than would be possible with presently available stands. A single individual may also remove the Christmas tree from the stand 114 with greater ease than would be possible with presently available stands.

Although the arm assemblies 118 are illustrated as depending downward from the support surface 118, it will be readily apparent to those skilled in the art from the above description that similar support arms could extend upward from a support surface and function in a similar manner without departing from the scope of the invention. As another alternative, the arm assemblies could be secured to a housing which does not necessarily include a horizontal support surface, but instead attaches the arm assemblies to the sides of the housing, without departing from the invention.

The present invention therefore provides a stand for elongated objects that permits a Christmas tree or other elongated object to be installed or removed by a single user. The stand is simple, durable, and easy to manufacture. Force is only applied to the cable during release of the elongated object, and is only enough to retract the top portion of the movable arm assembly, thus avoiding stressing the cable throughout the entire time that the elongated object is held within the stand. Thus, as used herein, a support surface may be considered to be any surface, whether vertical, horizontal, or angled, forming a part of the housing or secured to or within the housing, to which the arm assemblies are operatively secured.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A stand for elongated objects, comprising:
    a support surface;
    a plurality of arm assemblies secured approximately equiangularly about the support surface, each arm assembly comprising:
        an arm base having a first end movably secured adjacent to the support surface, and a second end, the arm base being structured for movement of the second end of the arm base towards and away from a center of the stand for elongated objects;
        a gripping arm having an upper arm portion, a lower arm portion, and a pivot point therebetween, the pivot point being pivotally secured to the second end of the arm base, the upper arm portion extending upward from the pivot point, the upper arm portion having an upper elongated object engaging end, the lower arm portion extending from the pivot point towards the center of the stand, the lower arm portion having an elongated object engaging surface;
        a first spring that is structured to bias the second end of the arm base towards the center of the stand; and
        a second spring that is structured to bias the lower arm portion towards the center of the stand.

2. The stand for elongated objects according to claim 1, wherein the arm assemblies are three in number.

3. The stand for elongated objects according to claim 1, wherein the upper elongated object engaging end includes a roller rotatably secured thereto.

4. The stand for elongated objects according to claim 3, wherein each roller defines a concave roller surface.

5. The stand for elongated objects according to claim 1, wherein the first end of the arm base is pivotally secured to the support surface.

6. The stand for elongated objects according to claim 1, wherein the gripping arm is substantially L-shaped, and the pivot point of the gripping arm is defined substantially at an intersection of the upper arm portion and the lower arm portion.

7. The stand for elongated objects according to claim 1, wherein the support surface is a ring from which the arm assemblies depend.

8. The stand for elongated objects according to claim 1, wherein the lower arm portion defines a convex elongated object engaging portion.

* * * * *